July 8, 1969      M. E. ORME      3,454,026

PRESSURE FEEDBACK

Original Filed March 14, 1966

INVENTOR.
MYRL E. ORME

ATTORNEY

United States Patent Office 3,454,026
Patented July 8, 1969

3,454,026
PRESSURE FEEDBACK
Myrl E. Orme, Canoga Park, Calif., assignor to The Bendix Corporation, North Hollywood, Calif., a corporation of Delaware
Continuation of application Ser. No. 533,969, Mar. 14, 1966. This application June 26, 1968, Ser. No. 744,611
Int. Cl. F15b 5/00; G05d 15/06
U.S. Cl. 137—85                                                       5 Claims

ABSTRACT OF THE DISCLOSURE

A pressure responsive spool valve of the type in which one end of the spool comprises both a surface responsive to the control pressure and a surface responsive to a feedback pressure. The two surfaces are isolated from each other through the use of a freely floating cylinder slidably surrounding a reduced diameter end portion of the spool. The control pressure for the spool valve acts externally of the floating cylinder while the feedback pressure acts internally of the floating cylinder.

---

Figure 1:
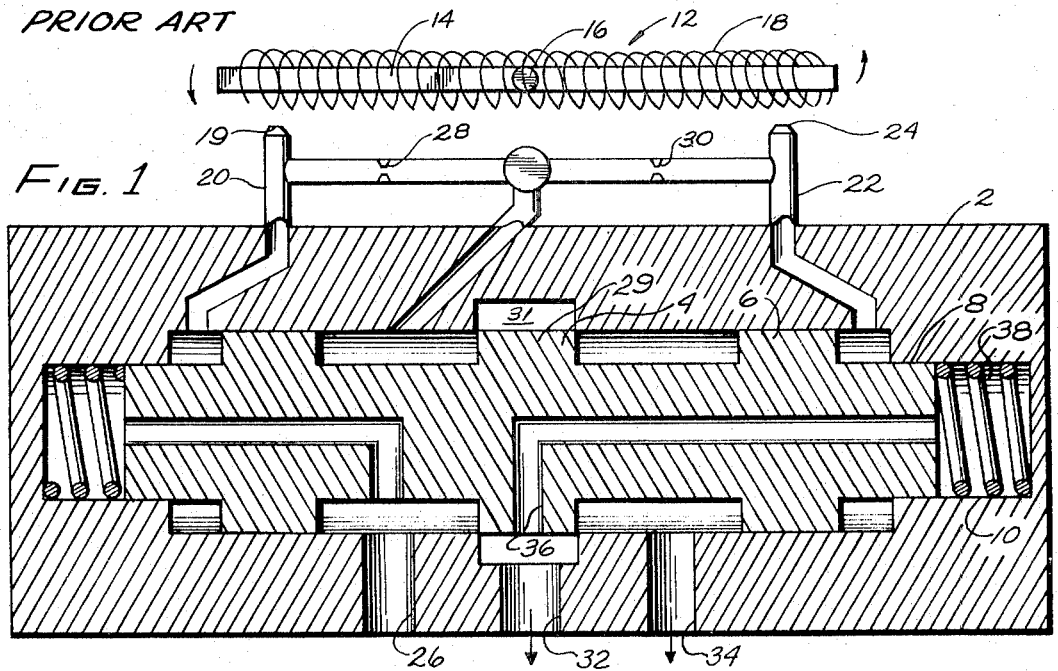

This application is a continuation of Ser. No. 533,969, filer Mar. 14, 1966, now abandoned.

This invention relates to a pressure feedback device. More particularly, this invention relates to a pressure feedback device which is actuated by a first stage servo mechanism. An arrangement of springs and cylinders at the end of the movable spool is provided such that lack of concentricity between adjacent portions of the spool are compensated for.

This invention represents an improvement in pressure feedback devices. A typical pressure feedback device is illustrated in the patent to Moog, Jr., et al., No. 2,931,389. In this type of servo valve which produces an output differential pressure independent of the flow rate, a movable spool is provided. Constant pressure is provided to an actuated mechanism, such as a piston and cylinder arrangement, by the position of a spool slidable within a cavity in a valve body. At the ends of the spool are portions adapted to receive pressure from a first servo valve. At one end of the spool, pressure is sensed in the actuated cylinder or other load and is used to position the spool such that the pressure is maintained at a predetermined rate.

In the type of servo valve to produce differential pressure independent of flow rate, such as shown in the Moog et al. patent, there is a problem in providing lapped surfaces which are concentric to portions of the spool adjacent the lapped surfaces. For example, in the aforementioned patent an enlarged piston is located adjacent each end of the spool valve. Adjacent these large pistons are smaller pistons which are slidable within another portion of the valve body. In order to provide close tolerances between the sliding piston portions and the valve body, it is necessary that the lapped valve portions and the mating internal surfaces be concentric relative to each other. To provide this extremely close tolerance concentricity, it is necessary that expensive machining be done which raises the cost of the valve. This invention is directed toward eliminating this element of expense in providing such a spool valve.

Briefly, this invention comprises a pressure feedback device in which a longitudinal spool is provided with enlarged piston portions adjacent each end which are lapped to the valve body and in addition having a portion adjacent each piston portion which is lapped to a cylinder surrounding it. However, the cylinder is held in place by springs which allow the cylinder portions to move radially, thus obviating the need for expensive lapping to provide concentricity.

An object of this invention is to provide an improved pressure feedback device.

It is a more particular object of this invention to provide an improved pressure feedback servo valve device in which the problems of lack of concentricity in a spool are essentially eliminated.

Figure 2:
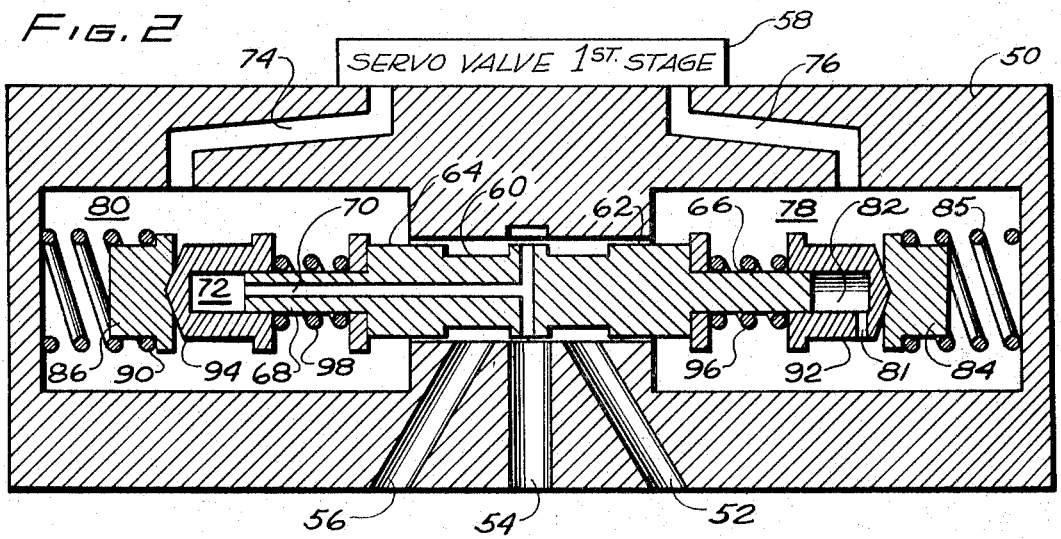

Other objects and advantages of this invention will become apparent as this description proceeds, taken in conjunction with the drawings in which:

FIG. 1 is a view partially in cross-section of a typical feedback device known in the prior art, and FIG. 2 is a view partially in cross-section of a pressure feedback device constructed according to the teachings of this invention.

Referring to FIG. 1, a typical prior art example is illustrated. Thus, a valve body is designated at 2 for the movable valve spool shown at 4. Valve spool 4 is slidable within the cavity in valve 2. Spool 4 has an enlarged piston portion 6 which is lapped to the passageway so as to have minimal leakage of fluid. A smaller diameter end of the spool is shown at 8 which is lapped to the valve body portion shown, for example, at 10. In this construction, it can be seen that due to the closeness of piston portion 6 and the end of spool 4 shown at 8, in order to maintain close tolerances in the lapped portions it is necessary that end portion 8 and piston portion 6, as well as the mating internal surfaces in valve body 2, be concentric relative to each other, which necessitates an expensive machining procedure. A first stage servo valve is shown generally at 12 and may, for example, be constructed in the manner taught by the aforementioned Moog et al. patent. For clarity, however, a typical construction would include a pivotable member 14 which is pivoted about an axis 16. By energizing coils 18, member 14 is caused to pivot in either direction. Should the left end of arm 14 be pivoted downwardly, it can be seen that orifice 19 would be closed, thus raising the pressure in line 20 and lowering the pressure in line 22 since a pressure drop would occur through orifice 24.

System pressure is introduced through port 26 and thus through orifices 28 and 30 into lines 20 and 22, respectively. It can be seen that, by raising the pressure in either line 20 or 22, the spool 4 will either move to the right, thus allowing pressure from pressure port 26 to pass by piston 29 through manifold 31 into line 32, or to the left, causing fluid pressure in manifold 31 to be exhausted through port 34 to actuate a hydraulic cylinder or other load. A return port is shown at 34, and when spool 4 is moved to the left, fluid from port 32 will pass by piston 6 into return line 34. An internally drilled passage 36 is provided which senses the cylinder pressure into feedback chamber 38. Thus, assuming that the desired pressure or location of spool 4 is obtained by actuation of first servo valve portion 12, should the pressure in manifold 31 drop, pressure in feedback chamber 38 will likewise drop, thus allowing spool 4 to move to the right, increasing pressure from inlet chamber 26 into the manifold 31, thus restoring the desired pressure level. Likewise, should the pressure increase in manifold 31, the pressure in chamber 38 will increase, moving spool 4 to the left, allowing the pressure to be relieved through outlet port 34. As thus far described, this typifies prior art devices. As can be seen and as previously explained, machining problems in lapping the surfaces of piston 6 and the smaller diameter surface of spool 4 shown at 8 creates a problem due to the need for concentricity.

Referring now to FIG. 2, which represents one embodiment of this invention, a valve body 50 is shown. This valve body has a pressure port 52, a system operating port such as a cylinder or other load 54, and a return line 56. A servo valve construction is shown generally at 58 which operates in the same manner as that of FIG. 1. Spool 60 is shown, which includes piston portions 62 and 64 with end sections of the spool shown at 66 and 68. As in the case of FIG. 1, an internally drilled passage 70 is provided for transferring pressure in port 54 to cavity 72. Pressure from the servo valve 58 is extered through lines 74 and 76 into chamber 78 and 80, respectively. A damping orifice or passage 81 is provided to allow the pressure in line 76 to be exerted into cavity 82.

Retainers 84 and 86 are provided at each end of the spool. These snubbers are supported by springs 85 and 90, respectively. Cylinders 92 and 94 are provided which are in turn supported on extensions 66 and 68 of spool 60 and located axially by means of springs 96 and 98, respectively. It can be seen that by this construction any lack of concentricity between, for example, end 66 and piston portion 62 become unimportant because cylinder 92 is allowed to move radially. At the same time it is pointed out that cylinder 92 and end portion 66 are lapped together, as are piston 62 and the valve body. However, it is not necessary that these lapped surfaces be concentric. The same reasoning applies to the opposite side of the spool.

In terms of operation, the embodiment of FIG. 2 operates as does that for the prior art FIG. 1. Thus it can be seen that by this invention the problems in providing concentrically lapped portions on a spool and mating internal surfaces of a valve have been obviated.

Having described this invention, it is to be understood that it is to be limited only by the scope of the claims appended hereto.

I claim:
1. A pressure feedback device comprising:
 a valve body having a passageway and enlarged chambers at opposite ends of said passageway;
 means to supply fluid under pressure to said passageway;
 means to receive fluid from the passageway;
 a spool slidable in said passageway having valving means thereon for connecting and disconnecting said supply and receiving means, said spool having reduced diameter end portions extending into said enlarged chambers, said spool being so constructed to substantially isolate said supply and receiving means from said chambers;
 a freely floating cylinder movable in each chamber slidably surrounding each end portion of the spool;
 resilient means within at least one of said chambers for exerting force against said spool;
 means for supplying a fluid pressure signal to at least one of said chambers to exert a force for moving said spool to control communication between said supply and receiving means;
 and feedback passage means connecting the interior of one of said cylinders with the means for receiving fluid so as to exert a force on one of said spool reduced end portions for opposing said first mentioned force.

2. A pressure feedback device as set forth in claim 1 wherein return conduit means are included communicating said passageway with a low fluid pressure source and said spool also includes valving means for connecting and disconnecting said return conduit means and said receiving means.

3. A pressure feedback device as set forth in claim 1 wherein said feedback passage means is in said spool.

4. A pressure feedback device according to claim 1 wherein each of said cylinders abuts a snubber.

5. A pressure feedback device as set forth in claim 4 wherein each of said snubbers includes a spring retainer section, springs are interposed between said section and said valve body urging said cylinder toward said end portions, and other springs are interposed between said cylinders and said spool urging said cylinders away from said end portions.

References Cited

UNITED STATES PATENTS

| | | | |
|---|---|---|---|
| 2,767,689 | 10/1956 | Moog | 137—625.62 |
| 2,831,464 | 4/1958 | Lillquist | 92—117 |
| 2,931,389 | 4/1960 | Moog et al. | 137—625.62 |
| 3,009,447 | 11/1961 | Lloyd | 137—85 |
| 3,015,317 | 1/1962 | Buchanan et al. | 137—625.62 |
| 3,095,906 | 7/1963 | Kolm | 137—625.62 |
| 3,176,594 | 4/1965 | Cruse | 92—51 |
| 3,286,734 | 11/1966 | Hartshorne | 137—625.64 |

ALAN COHAN, *Primary Examiner.*

U.S. Cl. X.R.
137—625.64